Patented Apr. 10, 1928.

1,665,355

UNITED STATES PATENT OFFICE.

AXEL TEODOR GUSTAFSON, OF GOTTENBORG, SWEDEN.

METHOD OF PRODUCING ARTICLES FROM RUBBER AND OTHER THERMOPLASTIC SUBSTANCES.

No Drawing. Application filed January 4, 1926, Serial No. 79,268, and in Sweden February 12, 1925.

When producing articles in moulds from rubber, gutta-percha, and other substances which are plastic when heated but stiff or elastic when cooled, difficulties frequently arise through the heated substance when in a soft or half melted state sticking to the mould employed and this sticking substists even after cooling down. This causes, in the first place, a primary loss of substance and, in the second place, a necessity for mechanical treatment of the surface of the article, in order to obtain the requisite smoothness and shine. Such mechanical treatment leads to a secondary loss of substance. Thus the moulded mass in its finished state fails to conform with any degree of exactitude to the mould or to the original object or pattern, from which said mould was produced.

The sticking effect varies considerably with the nature and condition of the substance to be moulded and of the mould itself. If, for instance, moulds of plaster of Paris are used, the sticking effect partly arises from its known porosity. Metal moulds, when the substance used contains sulphur (as in rubber compounds), set up chemical processes such as sulphidation.

The new method which forms the subject of the present invention will hereinafter be described in its application to a plaster mould employed in moulding a rubber substance, that is to say, unvulcanized rubber with an addition of sulphur. In this case the difficulties above mentioned are particularly prominent and numerous means for avoiding them have been proposed.

For instance, various fatty substances, of vegatable, animal or mineral origin have been employed to prevent sticking, as also have solutions of resins or of collodion, spread over the surface of the mould and allowed to dry. Alkali silicate solutions, soap solutions and so forth have also been proposed. Attempts have been made to powder the mould, for instance, or with talc or with so called bronz powder, and thin metal foils (say, of tin, aluminum or gold) have been interposed between the mould and the substance moulded. Experiments have even been made with a metal foil deposited on the mould electrolytically.

In other cases sheets of paper or textile fabric have been used for the same purpose. Such material, however, will either leave an impression of its structure upon the moulded article or wipe out or efface the keen details of the pattern or mould. Paper is besides too brittle, weak and non-elastic.

Although when using the old methods the sticking effect could, in some cases, be avoided or diminished, the keen relief frequently desired on the moulder article was not obtained, for instance, when using collodion solutions smeared onto the mould, because of the impossibility of applying the solution in an absolutely uniform layer. In practice the solutions were found always to accumulate in the lowest parts of the mould (the furrows and cavities thereof) so that such parts were partially or wholly effaced.

Also in cases where some kind of plastics were used as interposing material, for example, pyroxylin plastic, a sufficiently uniform layer can not be obtained for the same reason as set forth regarding the use of liquids.

The essential properties of an ideal foil for the purpose referred to are as follows:—

It should be as thin as possible; this quality becomes the more essential the smaller the object to be reproduced and the more intricate and richly detailed its surface.

It should be of uniform thickness and mass.

It should be pliable, so that it conforms easily to the features of the mould.

It should, to a certain extent, be elactic, so that it may, without bursting, follow the details of the mould when the mass is exposed to pressure.

It should be able to be damped (i. e. to absorb liquid) for the purpose of increasing its pliability and flexibility.

It should not take up particles either from the plastic mass of from the material of the mould, nor should it deliver particles to them.

It should be resistant to increased temperature and or to humidity without becoming loose, disintegrating or changing chemically. A foil possessing the properties mentioned can be made from cellulose derivatives, such as gelatinized nitro cellulose with or without camphor (celluloid, or colodion), acetyl cellulose, also other acetylated products and certain cellulose ethers with alcohol radicals. However the foil which is most suitable for the purpose here contemplated and which has best endured the test is one made of such derivatives of cellulose as scientifically are called cellulose hydrates. By cellulose hydrates I mean all such cellulose derivatives which are obtained when common cellulose is treated with chemicals such as zinc chloride, cupri or cupro ammonium compounds, alkali sulpho carbonates, or the like, such derivatives being used, for example, in the manufacture of artificial silk, cellophan, zellaloseglashaut.

The present invention refers to a method of producing articles in a casting mould or a pressure mould from rubber or other substances which become plastic when heated, and is characterized therein that a ready-made foil or cellulose derivatives is interposed between the mould and the mass to be moulded.

Preferably the foil is applied in a damp state, soaked with a suitable liquid chemically indifferent to the foil, to the mould and to the moulded mass. Such liquid should not necessarily form a layer upon the surface of the film but should rather be absorbed by it.

After the removal of the interposed foil a highly glossy surface is obtained, with the details of the original minutely reproduced thereon so that no further finish is requisite.

As illustrative of the degree of exactitude obtainable by the method of my present invention, it is to be remarked that finger print impressions and gramophone records have been reproduced thereby, in vulcanized rubber, with such accuracy as has never been achieved by the known methods hitherto in use.

Without further elaboration, the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claims.

I claim:—

1. The method of producing articles in a casting mould or a pressure mould from rubber or other substances which become plastic when heated, consisting in the interposition between the mould and the mass to be moulded of a ready-made foil of cellulose derivatives.

2. The method of producing articles in a casting mould or a pressure mould from rubber or other substances which become plastic when heated, consisting in the inter-position between the mould and the mass to be moulded of a ready-made foil of cellulose derivatives, said foil, before used in the mould, being first damped with the liquid to be absorbed which is chemically indifferent to the said foil as well as to the mould and the plastic mass.

In witness whereof, I hereunto subscribe my name this 12th day of December, 1925.

AXEL TEODOR GUSTAFSON.